United States Patent [19]

Caldarelli

[11] 4,047,880
[45] Sept. 13, 1977

[54] FLUIDS DISTRIBUTOR FOR ENERGIZED-FLUID SYSTEMS

[76] Inventor: Antonio Caldarelli, 281 W. Clinton St., Dover, N.J. 07801

[21] Appl. No.: 610,047

[22] Filed: Sept. 3, 1975

Related U.S. Application Data

[62] Division of Ser. No. 470,001, May 15, 1974, abandoned.

[51] Int. Cl.² .......................... F23D 11/44; F02K 9/02
[52] U.S. Cl. ..................................... 431/208; 431/259; 60/39.66; 60/39.82 P; 60/39.55; 60/39.74 A; 239/139; 239/419.3
[58] Field of Search ........ 60/39.71, 39.74 A, 39.74 R, 60/258, 260, 39.55, 39.82 P; 239/86, 135, 136, 139, 132.5, 419.3; 431/208, 259, 262

[56] References Cited

U.S. PATENT DOCUMENTS

| | | | |
|---|---|---|---|
| 2,411,040 | 11/1946 | Holthouse | 431/208 |
| 2,701,445 | 2/1955 | Andrews et al. | 60/39.82 H |
| 2,708,341 | 5/1955 | Zucrow | 60/39.82 H |
| 2,754,656 | 7/1956 | Munger | 60/39.74 A |
| 2,894,569 | 7/1959 | Jacolev | 239/132.5 |
| 2,897,649 | 8/1959 | Reddy | 60/39.82 H |
| 2,916,877 | 12/1959 | Walter | 60/39.55 |
| 3,276,205 | 10/1966 | Reisman et al. | 60/39.74 A |
| 3,490,238 | 1/1970 | Pohl et al. | 60/39.82 H |

FOREIGN PATENT DOCUMENTS

876,965   9/1961   United Kingdom ............... 60/39.71

Primary Examiner—Carlton R. Croyle
Assistant Examiner—Robert E. Garrett
Attorney, Agent, or Firm—Thomas N. Neiman

[57] ABSTRACT

The system comprises a burner-housing in which to ignite volatile fluids, together with means for admitting such fluids thereinto and means for discharging the combustion product therefrom. A coolant-carrying shell is enclosed within the burner-housing, the same having spray holes for discharging coolant onto the burner-housing inner surface, and for discharging coolant into a burner-housing defined combustion chamber. A distributor carried by the shell admits discrete fluids into the housing, and also has coolant passages formed therein. Additionally, the distributor has a fluid-heating arrangement disposed therewithin, as well as a fluid-ignition arrangement, the latter being selectively operative — to insure ignition of the housing-admitted volatile fluids. The combustion products are either simply vented from the burner-housing, for use thus, or are conducted through a terminal rocket nozzle for generating thrust.

6 Claims, 9 Drawing Figures

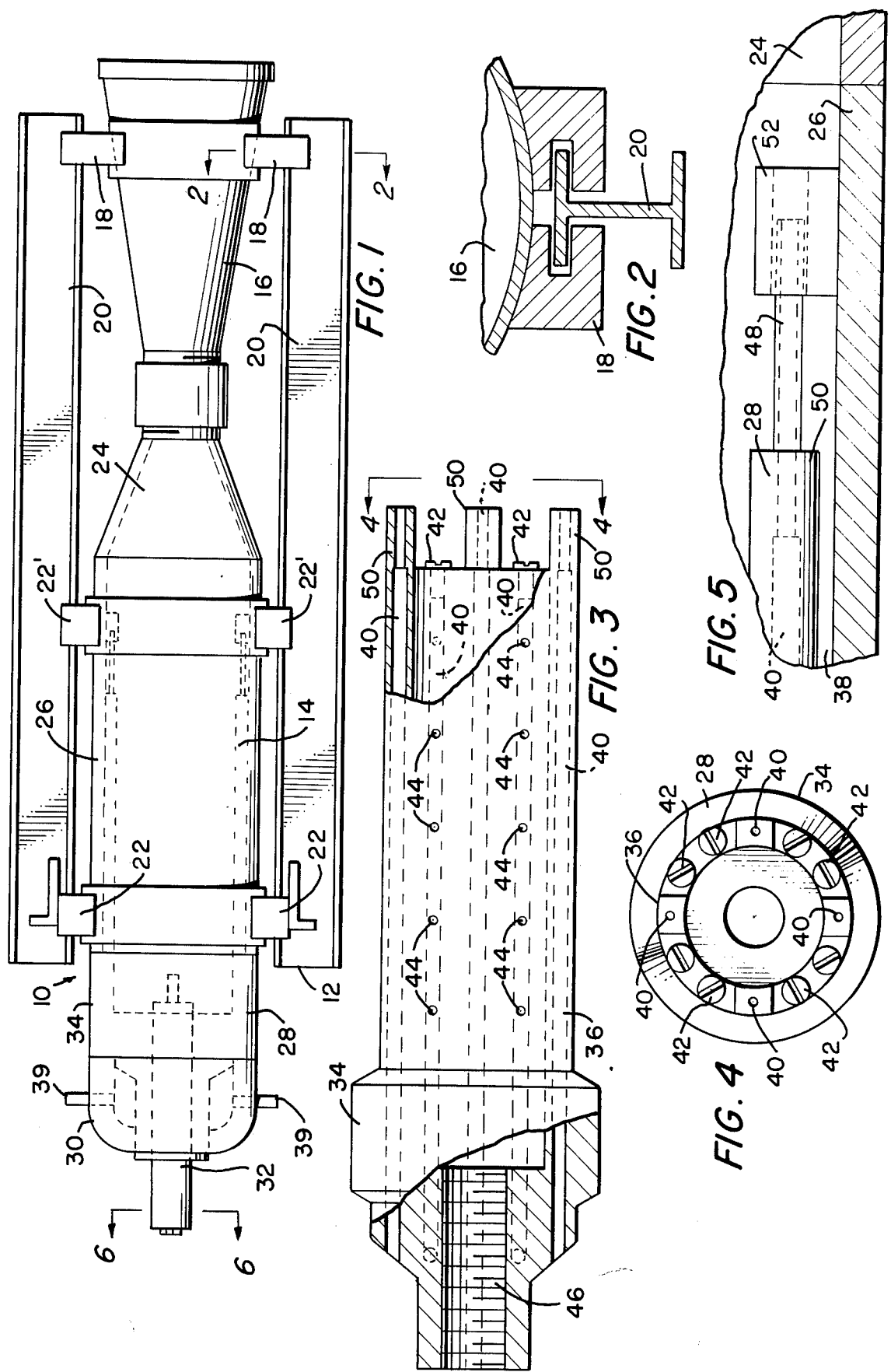

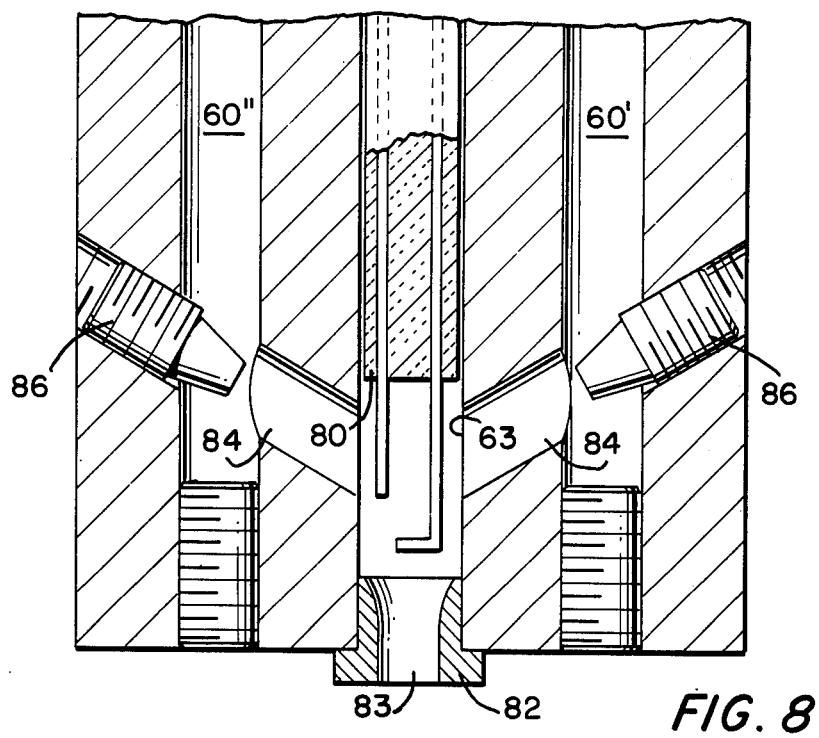
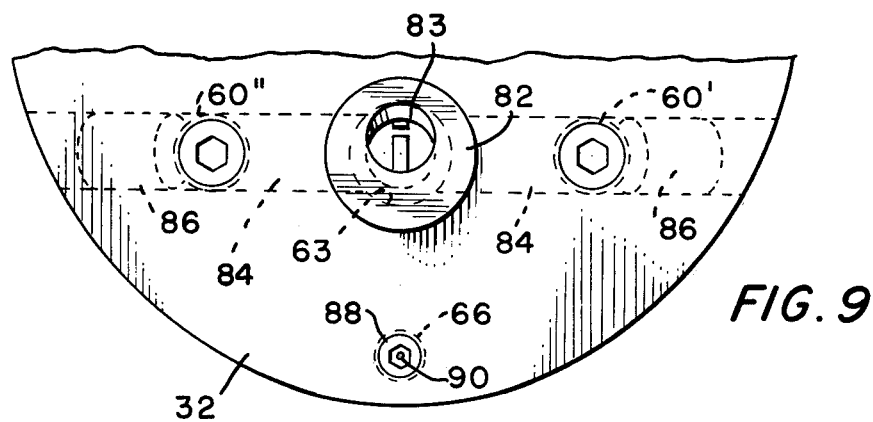

FLUIDS DISTRIBUTOR FOR ENERGIZED-FLUID SYSTEMS

This is a division of application Ser. No. 470,001, filed May 15, 1974 and which is now abandoned.

This invention pertains to energized-fluid systems, such as burners and rocket motor systems, and in particular to such systems usable for generating an energizing gas output and/or for generating a thrust-producing energized gas output having cooling means and ignition means.

Prior art energized-fluid systems are subject to early mortality and failures, in not having adequate means for dissipating the extremely high temperatures which such systems generate in structures and components, and also in not having reliable, fail-safe ignition provisioning.

It is an object of this invention to set forth an improved energized-fluid system.

Particularly it is an object of this invention to teach an energized-fluid system comprising means defining an energized-fluid burner-housing; means for admitting energized-fluid into said burner-housing means; means for exhausting energized fluid from said burner-housing means; and means for discharging coolant into said burner-housing means.

A feature of this invention comprises a burner-housing in which to ignite volatile fluids, together with means for admitting such fluids thereinto and means for discharging the combustion product therefrom. A coolant-carrying shell is enclosed within the burner-housing, the shell having spray holes from which coolant is discharged onto the burner-housing inner surface and into a burner-housing defined combustion chamber. The shell encloses a distributor which admits one or more fluids into the housing, the distributor also having coolant passageways formed therein and therealong. Both a fluid heater and a fluid igniter are mounted within the distributor.

Further objects and features of this invention will become apparent by reference to the following description, taken in conjunction with the accompanying figures, in which:

FIG. 1 is a longitudinal view, in elevation, of an apparatus embodying the invention, the same comprising a rocket motor structure;

FIG. 2 is a cross-sectional view, taken along section 2—2 of FIG. 1, illustrating the slidable, thermal-growth-accommodating engagement of the exhaust end of the structure with a supporting frame;

FIG. 3 is a longitudinal and partly cross-sectional view of the system shell, the same being enlarged relative to the view in FIG. 1, and FIG. 4 is an end view of the shell taken along 4—4 of FIG. 3 to show the inner, coolant dispensing arrangement of the shell;

FIG. 5 is a fragmentary, enlarged view of the arrangement by means of which the shell is slidably mounted within the outer housing of the structure to allow for thermal expansion;

FIG. 8 is a cross-sectional view taken along 8—8 of FIG. 6 depicting the fuel and oxydizer admittances to the ignition device, and the metering set screws which intrude on the fuel and oxygizer passageways; and FIG. 9 is an inner end view of the lower half of the distributor, the same showing the upwardly-directed flame nozzle.

Figure 6:
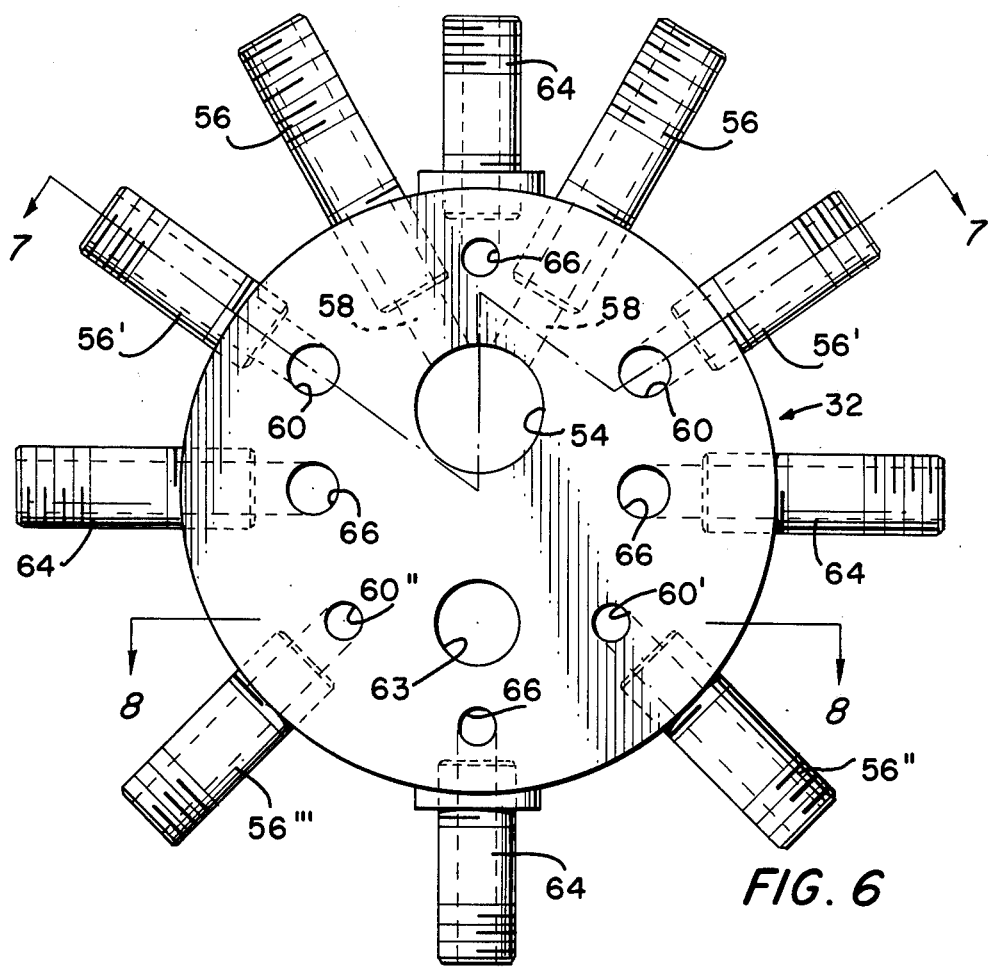
FIG. 6 is a cross-sectional view, taken along 6—6 of FIG. 1, depicting the fuel-heating or -atomizing and fuel-igniting passageways of the distributor, and illustrating the fuel, oxydizer, and coolant admitting adapters.

As shown in FIG. 1, the embodying apparatus 10 comprises a frame 12 to which a rocket motor system 14 is secured. The system 14 includes a diverging discharge cone or nozzle 16 which, by means of weldments 18, is slidably fixed to I-beams 20. The weldment-to-I-beam arrangement is shown to better advantage in FIG. 2. Other weldments 22 upstream from the cone 16 are welded to the I-beams immovably while intermediate weldments 22' are slidably coupled to the I-beams, in a manner similar to that shown in FIG. 2, whereby the rocket motor system 14 may exhibit thermal growth relative to the frame 12.

A converging cone 24 is coupled, by welding in this embodiment, to the outer housing 26, and a coolant-dispensing shell 28 is welded to an end of the housing opposite cone 24. An ellipsoidal head 30, serving as an upstream closure, is welded to an end of the shell 28 opposite the housing 26, both the head 30 and shell 28 being apertured centrally thereof to receive therein a distributor 32.

FIG. 3, in enlargement, shows the structure of shell 28. Shell 28 has an enlarged portion 34 which, together with head 30 and housing 26, defines an external surface of the system 14. Portion 34, head 30, and housing 26 all have a common outside diameter. Opposite ends of portion 34 are welded, about the periphery thereof, to head 30 and housing 26 — in this embodiment. Alternatively, of course, these components could be threadedly coupled and engaged. Shell 26 further has a reduced diameter and elongate portion 36 which is received within the housing 26 — in a spaced-apart relationship. The outer diameter of portion 36 and the inner diameter of the housing 26 define an annular space 38 therebetween, and into this space 38 the shell dispenses coolant.

Shell 28 has a plurality of spaced-apart axial passageways 40 formed therein. In this embodiment, 12 passageways 40 are formed; four of the twelve are open only at opposite ends of the shell, and the other eight are open at one end, closed at the opposite ends thereof by cap screws 42, and ported, throughout the length thereof in spaced-apart locations, by spray holes 44 which open radially/outwardly into space 38. By means of coolant-admitting adapters 39 (FIG. 1) fitted to head 30, and via passageways formed in the head and opening onto the shell 28, passageways 40 are supplied coolant via ends thereof adjacent to portion 34.

Shell 28 is centrally apertured as noted, at 46 to receive the distributor 32. A plurality of hollow bars 48 are butt-welded to terminal limbs 50 of shell 28 and further are slidably received in hollow sleeve-weldments 52 fixed within housing 26 adjacent to cone 24.

The four passageways 49, which are open only at the downstream ends thereof, carry coolant into the combustion chamber defined by the inner area of the housing 26 and central area of portion 36 of shell 28; the other eight passageways 40, by means of the spray holes 44, address coolant to the inner surface of the housing 26. Too, the hollow bars 48 direct streams of the coolant for impingement onto the interior of the cone 24.

The distributor 32 is the more novel or integrated element of the system 14, and comprises the heart of the functional apparatus. Accordingly, FIGS. 6 through 9 illustrate its structure in greatly enlarged detail. FIG. 6 is a cross-sectional view, taken along 6—6 of FIG. 1, and presenting the "upstream" aspect. Radially arranged adapters, not shown in FIG. 1, supply oxydizer, fuel, and coolant to heating or atomizing and ignition areas thereof as explained in the ensuing text.

Figure 7:
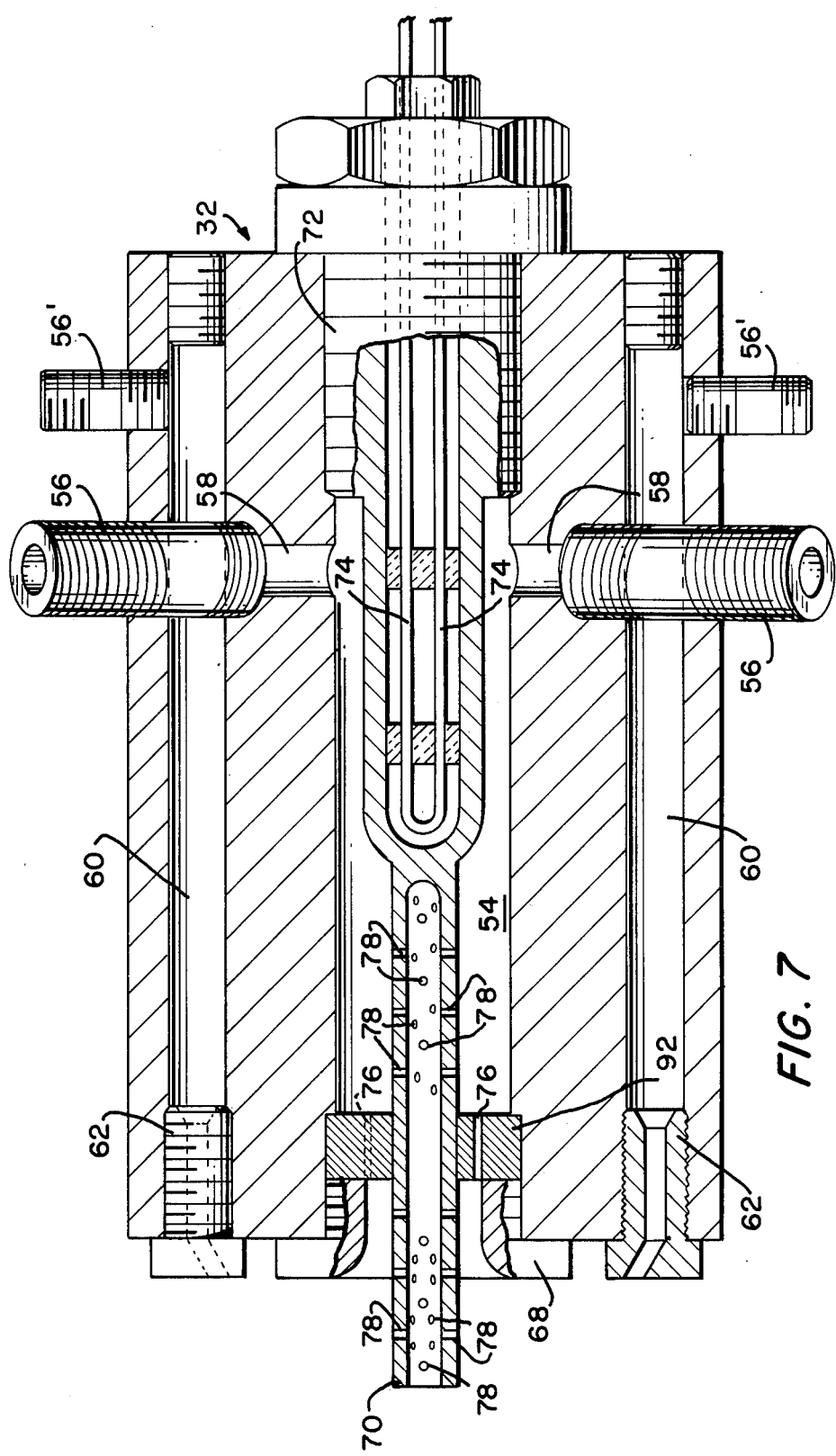
FIG. 7 is a contrived cross-sectional view, taken generally along section 7—7 of FIG. 6, showing the fuel admittance to the fuel-heating or -atomizing device.

At first, larger offset passageway 54, of distributor 32, is supplied main fuel via adapters 56. The latter are arrayed some sixty degrees of arc apart, and by hollow conduits therein supply main fuel to radial ports 58 which open onto passageway 54. Adapters 56' supply main oxydizer to axial passageways 60 which, as shown in FIG. 7, open downstream of the distributor into directing nozzles 62. Other passageways 60' and 60" which extend axially through the distributor carry fuel and oxydizer, respectively, from adapters 56' and 56''', to a second, smaller, offset passageway 63 formed in the distributor, the passageway 63 running parallel to passageway 54.

Four equally spaced-apart adapters 64 communicate with a same number of passageways 66 for conducting coolant upstream of the distributor. The extent and axial terminations thereof are not shown for these passageways 66, however, they are substantially similar to the four axially-open passageways 40 of shell 28. These too open into the shell and housing defined combustion chamber.

As shown in FIG. 7, passageway 54 has a nozzle 68 fitted into the open end thereof, nozzle 68 being apertured widely to enclose therewithin a multidrilled tube 70 which projects from a heating or atomizing assembly 72. Assembly 72 comprises a heating element 74 energized (by means not shown) to heat, atomize or vaporize the main fuel supplied thereto via passageways or ports 58. Through channels 76, of which, in this embodiment, five thereof are formed through the nozzle 68, and via holes 78 in tube 70, the vaporized, atomized or simply heated fuel — the main fuel — is discharged out of the end of the distributor 32. Also, nozzles 62 are so oriented as to direct the outflow of main oxydizer therefrom for direct spray thereof toward the main fuel discharge.

The smaller passageway 63 houses the ignition elements. As shown in FIG. 8, an electrially-operative ignition device 80 is held in adjacency to a discharge nozzle 82 within passageway 63. Means not shown energize the device 80 to cause ignition of the fuel and oxydizer conducted thereto, via passageways 60' and 60", respectively, and diagonal conduits 84. Metering plugs 86 intrude into passageways 60' and 60", adjustably, for controlling the fuel and oxydizer admittance to the ignition device 80. Nozzle 82 has a throat 84 which, as shown in FIG. 9, is directed toward the larger passageway 54 to insure the ignition of the fuel and oxydizer discharge of nozzle 68 (FIG. 7).

As noted, the axially-extending passageways 66 (FIG. 6) carry coolant out through the ignition-discharge end of the distributor. One of these terminations of passageways 66 is shown in FIG. 9 where it can be seen that the termination is closed by a capillary-bored plug 88. The fine, capillary bore 90 formed in the plug discharges a fine spary of coolant into the combustion chamber.

With reference to FIG. 7 it will be seen that the tube 70 is supported in passageway 54 by a separate spacer/insulator 92. The latter serves particular and important functions. For one, it prevents undue radial or otherwise oscillatory motion of the tube 70. Also, it allows tube 70 to manifest thermal growth and diminution, as it slidably receives the tube. In addition, it poses a bar to the admittance of excessive heat radiation from heating or atomizing assembly 72 from entering the downstream combustion chamber, and prevents combustion heat in the chamber from radiating into the distributor to cause undue risk of fuel ignition therein.

The apparatus 10 can be used either for gas generation or for gas generation and rocket thrust. For chemical purposes the housing 26 (where no rocket nozzle 16 is used) can be used for the reaction of different gases to produce new compounds.

The whole apparatus, including the cone 24, shell 28, housing 26, ellipsoidal head 30, and distributor 32 can be cooled to safe operating temperatures, while permitting the reaction product gases to be at the pressure and temperature desired. This is accomplished by the spraying of coolant in the hot gases. Evaporation of liquid coolant takes up heat.

Coolant can be made to vaporize, as explained already, and to mix in with the reactant product gases to give additional gas which can altogether be supplied to a rocket motor nozzle or for gas feed to an engine. This feature means less fuel is needed since the volume of gas of the coolant adds to the volume of gas of the reactant products.

For space flight use of a compound like hydrogen peroxide and an alcohol-water mixture coolant means that oxygen and water will be available at all times for personnel and engine use. Hydrogen peroxide alone can be used for gas generation, if desired. Oxygen of decomposed hydrogen peroxide can be used to react with other combustible fluids. If hydrogen peroxide or similar gas generating fluids are used, environmental pollution would be reduced since oxygen and water vapor are produced in the end products.

Positive combustion or reaction results, with the elimination of a flameout, since electric ignition or a hypergolic chemical type of ignition can be used as a standby. This is a feature especially desired for space flight. Air is not necessarily required for combustion or chemical reaction since an oxydyzer (and) or a hypergolic chemical can be used.

There are four main outstanding features to this invention design which are important. One feature operates to cool the burner so that safe operating temperatures are possible. A second characterisitc is that coolant can be gasified within passages. This coolant gas contributes its energy to the energy of the burned fuel. Heat is provided by the internal heating unit 72 to gasify fuel (and oxydyzer, if required). With enough heat generated during combustion or chemical reaction, the heating unit can be turned off (or left on, if desired). Thus atomization of certain type fuels is aided by the heating unit. With hydrogen peroxide fuel the heating unit can be used to decompose this substance. One other beneficial feature of the invention is that high or low pressure burning can be accomplished by the system. Operation in this case depends on the pressure and temperature of the burning fluid and the inlet pressures of the feed. As already mentioned, a fourth feature is the potential invention for use as a rocket motor.

The function of shell 28 is to protect the outer housing 26 when reaction or combustion takes place. The coolant used depends on the application. For space flight, for example, an alcohol water mixture may be required for storage because of freezing. Coolant fluid is pumped under pressure in the annulus between the shell 28. The coolant fluid in the annulus flows through the sleeve longitudinal holes 40, parallel to the burner axis.

Coolant impinges on the interior of the cone 24 to keep it under safe operating temperatures. The coolant can be a gas at this point, even if originally a liquid, due to heating.

With controlled operating conditions and coolant supply (assuming water is used) steam can be generated at the end of the coolant passages 40 and 66, and this can mix and pass out with the other gases being discharged. Of course control of coolant discharge pressure is required to prevent extinguishing of the burner flame by a steam flow reversal. This depends on the passage design and coolant pressure.

The fuel impinges on tube 70, and is heated at this point to vaporize or flash to the extent required. The large front end insulator/spacer 92 allows some fluid to pass through holes 76 for an axial direction flow. Fluid which doesn't pass through the insulator holes is forced on one side of the insulator into the perforated holes 78, and this fluid flows out of the distributor axially. This vaporized fluid contacts the oxydyzer directed toward it by nozzles 62. The oxydyzer fluid can also be gasified, and this depends on the temperature to which the coolant makes the distributor rise. The oxydyzer can be gasified separately,, but this would make the system more complex. Liquid oxydyzers which react in the liquid state with the gaseous fluid can be used.

The chemical reaction between the oxydyzer and the fuel generates large volumes of gas with high energy content. Oxydyzer is furnished by two passages 60 in the distributor, and a guide nozzle 62 at the end of each passage directs the flow towards the fuel from the perforated tube, outside the distributor cylinder. The flowing fluid also acts as a coolant in the distributor passages. A variation of the system would be to use a hypergolic or pyrophoric fluid in one of the oxydyzer passages 60 to assure burning for space applications. The hypergolic fluid could be used to start ignition of the fuel whereupon a switchover to oxydyzer can be made, or the burner can continue to use the hypergolic fuel. In some instances where a product like hydrogen peroxide is used, breakup of the hydrogen peroxide by heat or a catalytic perforated tube may be sufficient for gas generation since water vapor and oxygen are formed under these conditions.

To be assured of positive ignition especially for aircraft and space flights (and for normal operations, if so desired) the ignition device 80 is used. Two passages are used in the distributor, one 60" oxydyzer fluid, and one 60' for plain fuel. Hypergolic or pyrophoric fuel can also be used in place of the oxydyzer under some operating conditions. Under normal operating conditions the oxydyzer and fuel are directed by setscrew plugs 86 in the distributor to flow towards a sparking device 80 to initiate a flame. This burning fuel is in turn directed by a nozzle 84 to flow towards the main fuel. The period for which it is necessary to use the primary flame depends on the fuels and oxydyzers, and also on operating conditions. Once the main fuel is atomized, and combustion or chemical reaction occurs it is not necessary to continue using the ignition system. Radiant heat from the main flame should maintain combustion.

A simple type electric heater for the fuel feed atomization system is shown. However, other types of commercially available heaters could be used.

Mention has already been made of cooling the burner system. Cooling of the distributor for safe operation depends on the application of this invention, and on the coolant used. As an example, if plain coolant water were used, it might be desireable to let the distributor temperature rise to 500 degrees F. by passage design, coolant inlet temperature and pressure. In this case steam would form in the coolant passages of the distributor system. At the end of each coolant passage there is aserted a setscrew or plug 88 with a hole 90 to let steam or gas escape in an axial or other desired direction. These holes are placed near the periphery of the distributor, so as not to extinguish the main flame located within the circle of coolant holes. The holes are of size to just allow seepage of steam, if conditions require this.

Coolant does not have to be water for the distributor. It could be fuel of any organic fluid or inorganic fluid which reacts with oxydyzer or burns, since the fluids would still have a cooling action, and could be made to vaporize and burn upon leaving the distributor. The shell 28 does the major cooling of the burning or reacting gases. Instead of coolant fluid through the distributor coolant passages, forced air can be used either for cooling or combustion in surface (and air) application of this invention. Oxydyzer passages can be likewise used.

The apparatus 10, it is evident, can operate either at high or low pressures, since it can be designed by conventional theory as a fired pressure vessel. Also the distributor 32 by design can be made to operate at high or low gas pressures.

While I have described my invention, in connection with a specific ambodiment there of, it is to be clearly understood that this is done only by way of example, and not as a limitation to the scope of my invention as set forth in the objects there of and in the appended claims.

I claim:

1. For use in energized-fluid systems, a distributor for receiving and discharging volatile fluids, comprising:
   a body having an elongate axis;
   said body further having a plurality of axially-extending passageways formed therein for conducting discrete fluids therethrough;
   means carried by said body for admitting only one fluid to each passageway of said plurality of passageways;
   an axially-extending bore formed in said body and opening out onto an end of said body;
   an ignition device confined within said bore;
   conduits communicating at least one pair of said passageways with said bore, for conducting discrete fluids from said pair of passageways into said bore for contact with said ignition device;
   means disposed in at least one of said axially-extending passageways for heating fluid admitted thereinto;
   said fluid-heating means comprising a tube axially supported within said one axially-extending passageway in spaced-apart relationship to inner surfaces of said one passageway;
   said tube having a pair of axially-extending tube-bores formed therein, with a wall separating said tube-bores one from the other thereof;
   a heating element confined within one of said axially-extending tube-bores;
   the other of said tube-bores having a multiplicity of apertures formed therein normal to the axis of said other tube-bore for admitting fluid therethrough into said other tube-bore, to effect a vaporization of such fluid upstream of, and prior to address of such fluid to, said ignition device;

said other tube-bore opening externally of said body, to discharge vaporized fluid therefrom;

an annulus enveloping a portion of said tube and in engagement with said inner surfaces of said one passageway;

said annulus having a plurality of axially-extending channels formed therein opening intermediate said tube and said inner surfaces of said one passageway, and opening externally of said body, also to effect a vaporization of such fluid upstream of, and prior to address of such fluid to, said ignition device; and means in said body for cooling said body.

2. A distributor, according to claim 1, wherein: at least one pair of said discrete fluids passageways terminate, at downstream ends thereof, in replaceable nozzles; and said nozzles have discharge openings formed therein which are angularly oriented toward said tube.

3. A distributor, according to claim 1, wherein:

said body cooling means comprise a plurality of axially-extending passages formed in said body for conducting coolant axially therethrough.

4. A distributor, according to claim 3, wherein:

said discrete fluids passageways and said coolant passages arrayed radially of said body, relative to said body's axial center, each of said discrete fluids passageways being separated from another thereof most adjacent by an intervening one of said coolant passages.

5. A distributor, according to claim 3, wherein:

each of said coolant passages terminates, at a downstream end thereof, in a capillary-bored plug.

6. A distributor, according to claim 3, wherein:

each of said coolant passages has means replaceably secured in a downstream end thereof for effecting a discharging spray of coolant, upon liquid coolant being conducted through said passages.

* * * * *